United States Patent
Hilnbrand et al.

(10) Patent No.: US 10,198,007 B1
(45) Date of Patent: Feb. 5, 2019

(54) AUTOMATED VEHICLE SYSTEM TO AVOID TRAJECTORY DEFLECTION CAUSED BY RIDGE IN ROADWAY

(71) Applicant: Aptiv Technologies Limited, St. Michael (BB)

(72) Inventors: Brian R. Hilnbrand, Mountain View, CA (US); Michael H. Laur, Mission Viejo, CA (US); Divya Agarwal, Sunnyvale, CA (US)

(73) Assignee: APTIV TECHNOLOGIES LIMITED (BB)

( * ) Notice: Subject to any disclaimer, the term of this patent is extended or adjusted under 35 U.S.C. 154(b) by 0 days.

(21) Appl. No.: 15/782,219

(22) Filed: Oct. 12, 2017

(51) Int. Cl.
*B62D 6/00* (2006.01)
*G05D 1/02* (2006.01)
*B62D 15/02* (2006.01)

(52) U.S. Cl.
CPC ....... *G05D 1/0246* (2013.01); *B62D 15/0265* (2013.01); *G05D 1/0214* (2013.01); *G05D 1/0268* (2013.01)

(58) Field of Classification Search
CPC .............. G05D 1/021; B60W 2550/14; B60W 2550/147
See application file for complete search history.

(56) References Cited

U.S. PATENT DOCUMENTS

| 2009/0097038 A1* | 4/2009 | Higgins-Luthman ....................... B60G 17/019 356/602 |
| 2017/0174258 A1* | 6/2017 | Yamada ................. B62D 6/002 |

* cited by examiner

*Primary Examiner* — James A Shriver, II
*Assistant Examiner* — James J Triggs
(74) *Attorney, Agent, or Firm* — Lawrence D. Hazelton

(57) ABSTRACT

A system for operating an automated vehicle includes a perception-sensor and a controller. The perception-sensor is configured to detect a ridge in a travel-surface traveled by a host-vehicle. The controller is in communication with the perception-sensor. The controller is configured to operate the host-vehicle to avoid a trajectory-deflection of the host-vehicle when a tire of the host-vehicle encounters the ridge.

7 Claims, 2 Drawing Sheets

AUTOMATED VEHICLE SYSTEM TO AVOID TRAJECTORY DEFLECTION CAUSED BY RIDGE IN ROADWAY

TECHNICAL FIELD OF INVENTION

This disclosure generally relates to a system for operating an automated vehicle, and more particularly relates to a system that operates a host-vehicle to avoid a trajectory-deflection of the host-vehicle when a tire of the host-vehicle encounters a ridge in a travel-surface traveled by the host-vehicle.

BACKGROUND OF INVENTION

It is known that human-driven and automated vehicles sometimes have difficulty keeping the vehicle driving on a straight trajectory when driving over a ridge caused or defined by a sudden change in road type/height, especially when the ridge is parallel or near parallel (i.e. at a grazing angle) to the driving direction or trajectory of the vehicle. Instances of ridges often are present when a roadway is under construction where one lane is a new surface and an adjacent lane is an older surface. The parallel or grazing-angle ridge may cause the vehicle to unexpectedly swerve. A worst case scenario may include the vehicle momentarily losing control due to a grazing-angle ridge.

SUMMARY OF THE INVENTION

Described herein is a system configured to detect an instance of such a ridge, and operate or assist a human-operator to steer a host-vehicle in a manner that avoids the aforementioned risk of swerving or loss of control. The ridge may be detected based on changes in surface color which may be indicative of different types of asphalt, concrete, etc. on either side of a ridge. The system may use a camera to detect ridge boundary edge, and may use a lidar to detect surface type and confirm surface ridge boundary edge. Alternatively, or in addition to the aforementioned indictors, a ridge may be detected based on changes in surface height of travel-surface traveled by the host-vehicle. The system may use perception sensors (camera, lidar, radar, ultrasonic transducer) to detect raised edges along surface ridge boundary. The system may also use an inertial-measurement-unit (IMU) and/or a map database with road slope/camber information to detect differences in the vehicle tilt when straddling a ridge. If not properly navigated, the ridge may cause a transient (i.e. quick and unexpected) change in vehicle direction that is not the result of, for example, changes in steering-wheel angle or wind. The system may anticipate the effect of a ridge based on various attributes such as direction of the ridge, e.g. parallel or grazing-angle (near parallel) to the driving direction vs. straight across the driving direction (i.e. at a relatively acute-angle or near right-angle) so that both front tires pass over the ridge at about the same time so that there is little deflection of the host-vehicle.

The location of a detected instance of a ridge may be saved or uploaded to a digital map so other vehicles are aware of the presence of the ridge. With this information, the ridge may be avoided by, for example, adapting a biased position in a lane to avoid or straddle a ridge. If the ridge cannot be avoided because, for example, construction barriers force a lane-change, the system may adjust various control parameters used to control steering torque in anticipation of crossing the ridge.

In accordance with one embodiment, a system for operating an automated vehicle is provided. The system includes a perception-sensor and a controller. The perception-sensor is configured to detect a ridge in a travel-surface traveled by a host-vehicle. The controller is in communication with the perception-sensor. The controller is configured to operate the host-vehicle to avoid a trajectory-deflection of the host-vehicle when a tire of the host-vehicle encounters the ridge.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
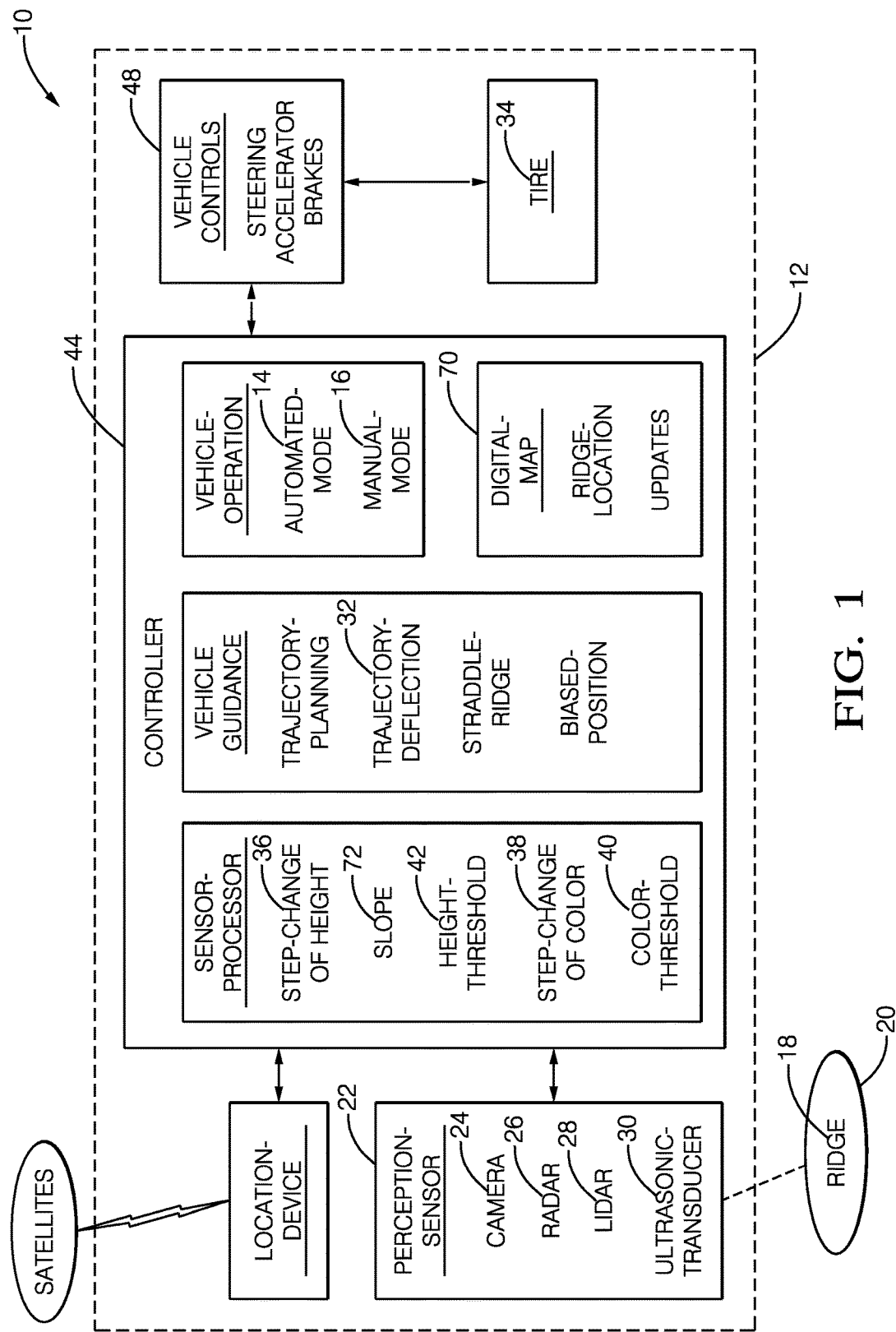
FIG. 1 is a diagram of system for operating an automated vehicle in accordance with one embodiment.

FIG. 1 illustrates a non-limiting example of a system 10 for operating an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist and/or warn the human-operator as needed to avoid the aforementioned problems or risks associated with the presence of a ridge 18 in a travel-surface 20 (i.e. a roadway) traveled by the host-vehicle 12.

As used herein, the ridge 18 may be any discontinuity in the travel-surface 20 that could cause a trajectory-deflection 32 of the host-vehicle 12 when a tire 34 of the host-vehicle 12 encounters (i.e. comes in contact with) the ridge 18. As used herein, the trajectory-deflection 32 is generally characterized as any change in the direction of travel (i.e. the trajectory) of the host-vehicle 12 that is caused by an instance of the ridge 18 or any other irregularity in the travel-surface 20. The trajectory-deflection 32 may be characterized by some as an unexpected change in trajectory. However, it is contemplated that if the dimensions of the ridge 18 are known, and the dynamic behavior characteristics of the host-vehicle 12 are well understood, the trajectory-deflection 32 is expected to be relatively predictable.

It is contemplated that instances of the ridge 18 that are of concern will typically be some sort of linear discontinuity running parallel or close to parallel (i.e. at or near a lateral grazing-angle) to a roadway. As a non-limiting example, the ridge 18 may be the edge of a roadway where the roadway transitions from a paved surface to a gravel surface that is typically associated with a shoulder of a roadway. As will be recognized by most who have ever driven an automobile, if all or some of the tires of a vehicle are on a shoulder, steering onto the paved part of the roadway typically requires a relatively deliberate steering action on the part of the driver. That is, it is often problematic if there is an attempt to very gradually steer from the shoulder onto the pavement while the host-vehicle 12 travels in a trajectory that is almost parallel to the edge of the roadway.

Another non-limiting example of the ridge 18 may be due to a layer of new pavement on one lane of a roadway that is adjacent to a second lane that is old pavement which may underlie the new pavement. As will be recognized by many drivers, if a lane change from the old pavement to the new pavement is too gradual, i.e. the ridge 18 and vehicle trajectory cross at or near a grazing angle, the ridge 18, which is defined at the boundary between the old pavement and the new pavement, may cause the trajectory of the host-vehicle 12 to be erratic, i.e. cause an instance of the trajectory-deflection 32. In both of these examples, the ridge 18 maybe characterized by a step-change of height 36 of the travel-surface 20. As another alternative, the ridge 18 may be defined by a relatively deep and/or wide crack in the travel-surface 20, a crack deep enough and/or wide enough to cause the trajectory of the host-vehicle 12 to be erratic if the ridge 18 is crossed at a grazing-angle, e.g. less than twenty-five degrees (25°) offset from parallel.

The system 10 includes a perception-sensor 22 configured to detect an instance of the ridge 18 in the travel-surface 20 traveled by a host-vehicle 12. By way of example and not limitation, the perception-sensor 22 may include or consist of a camera 24, a radar 26, a lidar 28, an ultrasonic-transducer 30, or any combination thereof. If the perception-sensor 22 consists of or includes the camera 24, the system 10 may be configured to detect a step-change of color 38 of the travel-surface 20. The location of the step-change of color 38 relative to the host-vehicle 12 may be designated to be the ridge 18 when the step-change of color 38 is greater than a color-threshold 40. The step-change of color 38 may be indicated in terms of hue and/or intensity. If the camera 24 is a black and white type camera, the step change of color 38 may be indicated by a grey-scale reading. In either case, if the step-change of color 38 is significant enough, i.e. greater than the color-threshold 40, then the presence of an instance of the ridge 18 may be indicated.

Preferably, the perception-sensor 22 is configured to detect the step-change of height 36 of the travel-surface 20, and the step-change of height 36 is designated to be an instance of the ridge 18 when the step-change of height 36 is greater than a height-threshold 42, e.g. fifteen millimeters (15 mm). As will be recognized by those in the art, any one, or combination of the radar 26, the lidar 28, or the ultrasonic-transducer 30 (e.g. an array of ultrasonic-transducers) could be used to readily detect a step-change of height 36 of the travel-surface 20. For a change in height to qualify as an instance of the ridge 18, the system 10 may also require that the change in height occurs over some limited distance, e.g. a distance equal to or less than the step-change in height 36. That is, it may be required that the transition from one height to another height should have a slope steeper than a slope-threshold, forty-five degrees (45°) for example. However, it is recognized that different vehicles and different tire sizes/types may be more or less susceptible to experiencing the trajectory-deflection 32 for a given size/shape of an instance of the ridge 18. As such, it is contemplated that the height-threshold 42, the color-threshold 40, and the slope-threshold may likely be selected or tuned using empirical testing methods. It is also contemplated that when the ridge 18 is characterized as a step-change of the height 36, it may be advantageous to steer the host-vehicle 12 so that a crossing-angle of the tire when the ridge 18 is contacted by the tire is greater than a threshold, twenty-five degrees (25°) for example.

The system 10 includes a controller 44 in communication with the perception-sensor 22. The controller 44 may include a processor (not specifically shown) such as a microprocessor or other control circuitry such as analog and/or digital control circuitry including an application specific integrated circuit (ASIC) for processing data as should be evident to those in the art. The controller 44 may include memory (not specifically shown), including non-volatile memory, such as electrically erasable programmable read-only memory (EEPROM) for storing one or more routines, thresholds, and captured data. The one or more routines may be executed by the processor to perform steps for detecting an instance of the ridge based on signals received by the controller 44 from the perception-sensor 22 as described herein.

As will be explained in more detail below by way of non-limiting examples, the controller 44 may be configured to operate the host-vehicle 12 in the automated-mode 14, i.e. operate the vehicle controls 48 to avoid an instance of the trajectory-deflection 32 of the host-vehicle 12 when the tire 34 of the host-vehicle 12 encounters an instance of the ridge 18. If the host-vehicle 12 is being operated in the manual-mode 16, the assistance to the human-operator may include providing an audible and/or visual warning regarding the presence of an instance of the ridge 18, or temporarily adjusting steering torque at the steering-wheels of the host-vehicle 12 to assist the human-operator to better steer across the ridge 18 and thereby avoid an instance of the trajectory-deflection 32.

Figure 2:
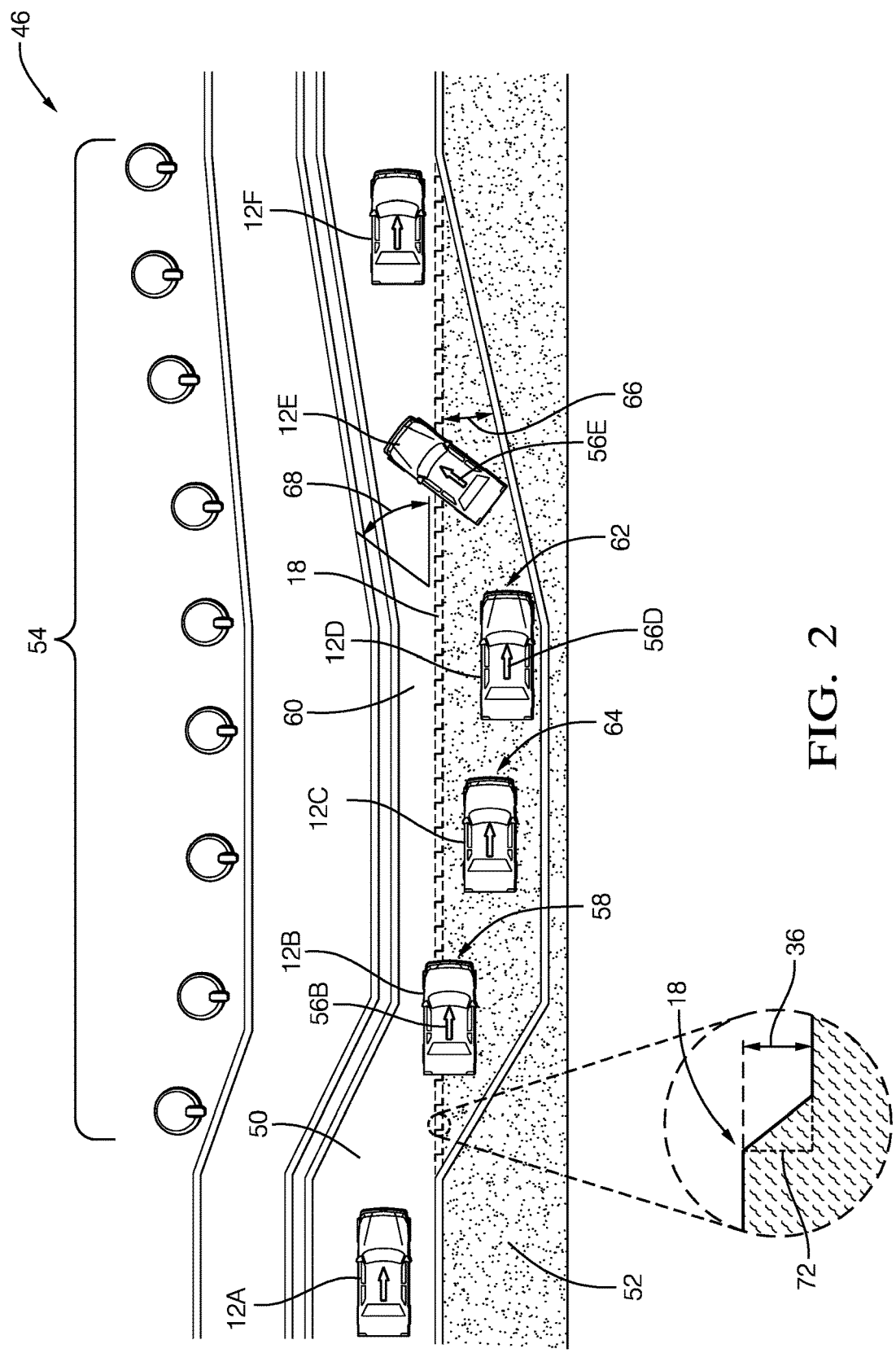
FIG. 2 is a scenario encountered by the system of FIG. 1 in accordance with one embodiment.

FIG. 2 illustrates a non-limiting example of a scenario 46 where multiple instances of the host-vehicle 12A, 12B, 12C, 12D, 12E, and 12F are depicted as proceeding along the travel-surface 20 that includes an instance of the ridge 18 between a paved-surface 50 and a gravel-shoulder 52 of a roadway at a construction-zone 54

The host-vehicle 12B depicts an example of where the ridge 18 is oriented parallel to a travel-direction 56B of the host-vehicle 12B. For this situation, the controller 44 may be configured to operate the host-vehicle 12B to straddle the ridge 18 when the ridge 18 is located in a middle-portion 58 of the travel-surface 20. It is contemplated that in some situations the host-vehicle 12B may continue to straddle the ridge 18 as host-vehicle 12B proceeds through the construction-zone 54.

The illustration of the host-vehicle 12C and the host-vehicle 12D depicts an example of where the ridge 18 is oriented parallel to a travel-direction 56D of the host-vehicle 12D. For this situation, the controller 44 may be configured to operate the host-vehicle 12D to biased-position 62 away from the ridge 18 when the ridge 18 is located in an edge-portion 60 of the travel-surface 20. That is, if traveling in the center of a lane (as suggested by the illustration of the host-vehicle 12C) could cause inadvertent contact of the tire 34 to the ridge 18, then it may be preferable to use a lane position as depicted for the host-vehicle 12D which is illustrated in the biased-position 62 rather than a centered-position 64 as depicted for the host-vehicle 12C.

The host-vehicle 12E depicts an example of where the ridge 18 is oriented at a grazing-angle 66 to travel-lane, i.e. parallel to the travel-direction 56D of the host-vehicle 12D. For this situation, the controller 44 may be configured to veer, as suggested by illustration of the travel-direction 56E of the host-vehicle 12E, on order to cross the ridge 18 at a crossing-angle 68 characterized as closer to a right-angle (not shown, but well-understood) than the grazing-angle 66, i.e. characterized as between a right-angle and the grazing-angle 66. As will be recognized by most drivers of automobiles, the veering or swerving of the host-vehicle 12 as part of trajectory-planning for the host-vehicle 12 allows for the ridge 18 to be crossed at closer to a right-angle which should reduce any effect by an instance of the trajectory-deflection 32, and provide for some lateral-momentum of the host-vehicle 12E for the same effect.

It is recognized that the ridge 18 may be a step-change or may be a more gradual blended transition from one surface to another. That is, the ridge 18 may be characterized by a slope 72. If the ridge 18 is relatively steep, i.e. almost a true step-change or close to ninety-degrees (90°), the crossing-angle 68 may need to be closer to a right-angle than would be the case if the slope 72 was relatively gradual, e.g. less than forty-five-degrees (45°). Those in the perception sensor arts will recognize that the slope 72 of the ridge 18 may be readily determined using the lidar 28 or an array of the ultrasonic-transducer 30. Accordingly, the controller may be advantageously configured to determine the crossing-angle 68 used to cross the ridge 18 based on the slope 72 of the ridge 18.

It is envisioned that the system 10 may include or have remote access to a digital-map 70 (FIG. 1) that may include a record of a ridge-location where an instance of the ridge 18 is located on the digital-map 70. It is also envisioned that the digital-map 70 may be updated when an instance of the ridge 18 is detected so that when other vehicles travel the same roadway, those other vehicles have prior knowledge of the presence of an instance of the ridge 18.

Accordingly, a system for operating an automated vehicle to cross a ridge 18 (the system 10), a controller 44 for the system 10, and a method of operating the system 10 are provided. The system 10 is configured to detect an instance of the ridge 18, and operate the host-vehicle, or assist a human-operator to steer a host-vehicle 12, in a manner that avoids the aforementioned risk of swerving or loss of control caused by an instance of the trajectory-deflection 32.

While this invention has been described in terms of the preferred embodiments thereof, it is not intended to be so limited, but rather only to the extent set forth in the claims that follow.

We claim:

1. A system for operating an automated vehicle, said system comprising:
   a perception-sensor configured to detect a ridge in a travel-surface traveled by a host-vehicle; and
   a controller in communication with the perception-sensor, said controller configured to operate the host-vehicle to avoid a trajectory-deflection of the host-vehicle when a tire of the host-vehicle encounters the ridge, wherein, when the ridge is oriented at a grazing-angle to a travel-direction of the host-vehicle, the controller is configured to veer the host-vehicle to cross the ridge at a crossing-angle characterized as between a right-angle and the grazing-angle.

2. The system in accordance with claim 1, wherein the perception-sensor is configured to detect a step-change of height of the travel-surface, and the step-change of height is designated to be a ridge when the step-change of height is greater than a height-threshold.

3. The system in accordance with claim 1, wherein the perception-sensor is configured to detect a step-change of color of the travel-surface, and the step-change of color is designated to be a ridge when the step-change of color is greater than a color-threshold.

4. The system in accordance with claim 1, wherein the ridge is oriented parallel to a travel-direction of the host-vehicle, and the controller is configured to operate the host-vehicle to straddle the ridge when the ridge is located in a middle-portion of the travel-surface.

5. The system in accordance with claim 1, wherein the ridge is oriented parallel to a travel-direction of the host-vehicle, and the controller is configured to operate the host-vehicle to biased-position away from the ridge when the ridge is located in an edge-portion of the travel-surface.

6. The system in accordance with claim 1, wherein the crossing-angle is determined based on a slope of the ridge.

7. The system in accordance with claim 1, wherein the crossing-angle is determined based on a step-change of height of the ridge.

* * * * *